US012637221B2

(12) United States Patent
Clark et al.

(10) Patent No.: US 12,637,221 B2
(45) Date of Patent: May 26, 2026

(54) LOW SPOOL ELECTRICAL MACHINE ARRANGEMENTS FOR HYBRID-ELECTRIC ENGINES

(71) Applicant: RTX Corporation, Farmington, CT (US)

(72) Inventors: Thomas E. Clark, Wells, ME (US); Jeffrey T. Morton, Manchester, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/791,834

(22) Filed: Aug. 1, 2024

(65) Prior Publication Data

US 2026/0035082 A1 Feb. 5, 2026

(51) Int. Cl.
| | |
|---|---|
| *B64D 27/33* | (2024.01) |
| *B64D 27/10* | (2006.01) |
| *B64D 27/40* | (2024.01) |
| *B64D 33/08* | (2006.01) |
| *F02C 7/32* | (2006.01) |
| *H02K 7/116* | (2006.01) |
| *H02K 7/18* | (2006.01) |
| *H02K 9/18* | (2006.01) |

(52) U.S. Cl.
CPC ............. *B64D 27/33* (2024.01); *B64D 27/10* (2013.01); *B64D 27/406* (2024.01); *B64D 33/08* (2013.01); *F02C 7/32* (2013.01); *H02K 7/116* (2013.01); *H02K 7/1823* (2013.01); *H02K 9/18* (2013.01); *F05D 2260/4031* (2013.01)

(58) Field of Classification Search
CPC ...... B64D 27/33; B64D 27/10; B64D 27/406; B64D 33/08; F02C 7/32; H02K 7/116; H02K 7/1823; H02K 9/18; F05D 2260/4031
USPC .......................................................... 290/52
See application file for complete search history.

(56) References Cited

U.S. PATENT DOCUMENTS

| | | | | |
|---|---|---|---|---|
| 3,831,888 A | * | 8/1974 | Baker | ................... B64D 27/406 244/54 |
| 3,844,115 A | * | 10/1974 | Freid | .................... B64D 27/404 244/54 |
| 6,212,974 B1 | | 4/2001 | Van Duyn | |

(Continued)

FOREIGN PATENT DOCUMENTS

| | | |
|---|---|---|
| EP | 2062819 A1 | 5/2009 |
| EP | 2123883 A2 | 11/2009 |

(Continued)

OTHER PUBLICATIONS

Non-final Office Action dated May 20, 2025, in connection with U.S. Appl. No. 18/774,708, 16 pages.

(Continued)

*Primary Examiner* — Charles Reid, Jr.

(57) ABSTRACT

A system includes a nacelle, a gas turbine engine, and an electrical machine. The nacelle includes an upper bifurcation and an engine core compartment. The gas turbine engine includes a low pressure spool and is disposed within the nacelle. The electrical machine is disposed within the upper bifurcation and is configured to transfer mechanical power between the low pressure spool and the electrical machine.

20 Claims, 4 Drawing Sheets

(56)  References Cited

U.S. PATENT DOCUMENTS

| | | | | |
|---|---|---|---|---|
| 6,401,448 | B1 * | 6/2002 | Manteiga | B64D 27/404 |
| | | | | 60/797 |
| 6,607,165 | B1 * | 8/2003 | Manteiga | B64D 27/406 |
| | | | | 244/54 |
| 8,607,578 | B2 | 12/2013 | Fert | |
| 8,966,911 | B2 | 3/2015 | Ress, Jr. et al. | |
| 10,293,950 | B2 | 5/2019 | Ronski et al. | |
| 10,619,567 | B2 | 4/2020 | Roever | |
| 11,131,208 | B2 | 9/2021 | Auker et al. | |
| 11,248,523 | B2 | 2/2022 | Leque et al. | |
| 11,293,300 | B2 | 4/2022 | Charier et al. | |
| 11,415,023 | B2 | 8/2022 | White et al. | |
| 11,674,414 | B2 | 6/2023 | Gajowniczek et al. | |
| 11,988,150 | B2 | 5/2024 | Bergo | |
| 2005/0067528 | A1 * | 3/2005 | Loewenstein | B64D 27/40 |
| | | | | 244/54 |
| 2010/0107650 | A1 * | 5/2010 | Ress, Jr. | F02C 7/32 |
| | | | | 290/52 |
| 2014/0090386 | A1 | 4/2014 | Cloft et al. | |
| 2015/0292352 | A1 * | 10/2015 | Marche | B64D 33/08 |
| | | | | 415/116 |
| 2018/0162537 | A1 * | 6/2018 | Schwarz | H02K 7/1823 |
| 2022/0298930 | A1 | 9/2022 | Gajowniczek et al. | |

FOREIGN PATENT DOCUMENTS

| | | |
|---|---|---|
| EP | 2607658 A2 | 6/2013 |
| EP | 3690214 A1 | 8/2020 |
| WO | 2010096083 A1 | 8/2010 |

OTHER PUBLICATIONS

Bingelis, "Firewalls," EAA, originally published in Experimenter, Mar. 1995, 2 pages.
Velling, "Limited and Fits," fractory.com, Aug. 2020, 20 pages.
Final Office Action dated Oct. 23, 2025, in connection with U.S. Appl. No. 18/774,708, 21 pages.
European Search Report dated Dec. 5, 2025, in connection with European Application No. 25193570.6, 9 pages.
European Search Report dated Dec. 12, 2025, in connection with European Application No. 25190014.8, 9 pages.
Action issued Mar. 17, 2026, in connection with U.S. Appl. No. 18/774,708, 17 pages.

* cited by examiner

LOW SPOOL ELECTRICAL MACHINE ARRANGEMENTS FOR HYBRID-ELECTRIC ENGINES

TECHNICAL FIELD

This disclosure generally relates to engine system integration. More specifically, this disclosure relates to low spool electrical machine arrangements for hybrid-electric engines.

BACKGROUND

A typical gas turbine engine includes a high pressure spool (high spool) and a low pressure spool (low spool). Some gas turbine engines may include an intermediate pressure spool. Increasingly, in electric and hybrid-electric applications such as gas turbine engine-powered aircraft, dual spool power extraction and/or power injection may be utilized. In some applications, this involves the use of mechanical offtakes such as external towershafts from both the high and low spools to an engine core compartment and/or engine fan case compartment, where the mechanical offtakes are integrated into a single accessory gearbox.

SUMMARY

This disclosure relates to low spool electrical machine arrangements for hybrid-electric engines.

In some examples, a system includes a nacelle, a gas turbine engine, and an electrical machine. The nacelle includes an upper bifurcation and an engine core compartment. The gas turbine engine includes a low pressure spool and is disposed within the nacelle. The electrical machine is disposed within the upper bifurcation and is configured to transfer mechanical power between the low pressure spool and the electrical machine.

Any single one or any combination of the following features may be used with the examples above. The system may include a gearbox mechanically coupled to an input/output shaft of the electrical machine and a towershaft mechanically coupled to the gearbox and the low pressure spool. The gearbox and the towershaft may be configured to transfer the mechanical power between the low pressure spool and the electrical machine. The system may include a transmission. The gearbox may be mechanically coupled to the input/output shaft of the electrical machine via the transmission. The electrical machine may be disposed at a top, centered position of the gas turbine engine. The gas turbine engine may be mounted to the nacelle via at least two thrust links disposed atop the engine, and the electrical machine may be disposed between the at least two thrust links. The system may include a controller disposed within the upper bifurcation configured to control an operation of the electrical machine. The system may include a thermal management system (TMS) disposed within the upper bifurcation configured to cool at least one of the electrical machine and a controller configured to control an operation of the electrical machine.

In other examples, a line replaceable unit (LRU) includes an electrical machine configured to transfer mechanical power between a low pressure spool of a gas turbine engine and the electrical machine. The LRU is configured to be disposed within an upper bifurcation of a nacelle configured to house the gas turbine engine within the nacelle.

Any single one or any combination of the following features may be used with the examples above. The LRU may include a gearbox mechanically coupled to an input/output shaft of the electrical machine. The gearbox may be configured to mechanically couple to the low pressure spool via a towershaft to transfer the mechanical power between the low pressure spool and the electrical machine. The LRU may include a transmission. The gearbox may be mechanically coupled to the input/output shaft of the electrical machine via the transmission. The electrical machine may be configured to be positioned at a top, centered position of the gas turbine engine when the LRU is disposed within the upper bifurcation of the nacelle. The LRU may include a controller configured to control an operation of the electrical machine. The LRU may include a TMS configured to cool at least one of the electrical machine and a controller configured to control an operation of the electrical machine.

In still other examples, an aircraft includes an airframe, a nacelle, a gas turbine engine, and an electrical machine. The nacelle includes an upper bifurcation and an engine core compartment, and the nacelle is mounted to the airframe via a pylon. The gas turbine engine includes a low pressure spool, and the gas turbine engine is disposed within the nacelle and mounted to the nacelle via at least two thrust links disposed atop the gas turbine engine and below the pylon. The electrical machine is configured to transfer mechanical power between the low pressure spool and the electrical machine, and the electrical machine is disposed at a top, centered position above the gas turbine engine between the thrust links.

Any single one or any combination of the following features may be used with the examples above. The aircraft may include a gearbox mechanically coupled to an input/output shaft of the electrical machine and a towershaft mechanically coupled to the gearbox and the low pressure spool. The gearbox and the towershaft may be configured to transfer the mechanical power between the low pressure spool and the electrical machine. The aircraft may include a transmission. The gearbox may be mechanically coupled to the input/output shaft of the electrical machine via the transmission. The aircraft may include a controller configured to control an operation of the electrical machine. The controller may be disposed within the upper bifurcation. The aircraft may include a TMS configured to cool at least one of the electrical machine and a controller configured to control an operation of the electrical machine. The TMS may be disposed within the upper bifurcation.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

Figure 1:
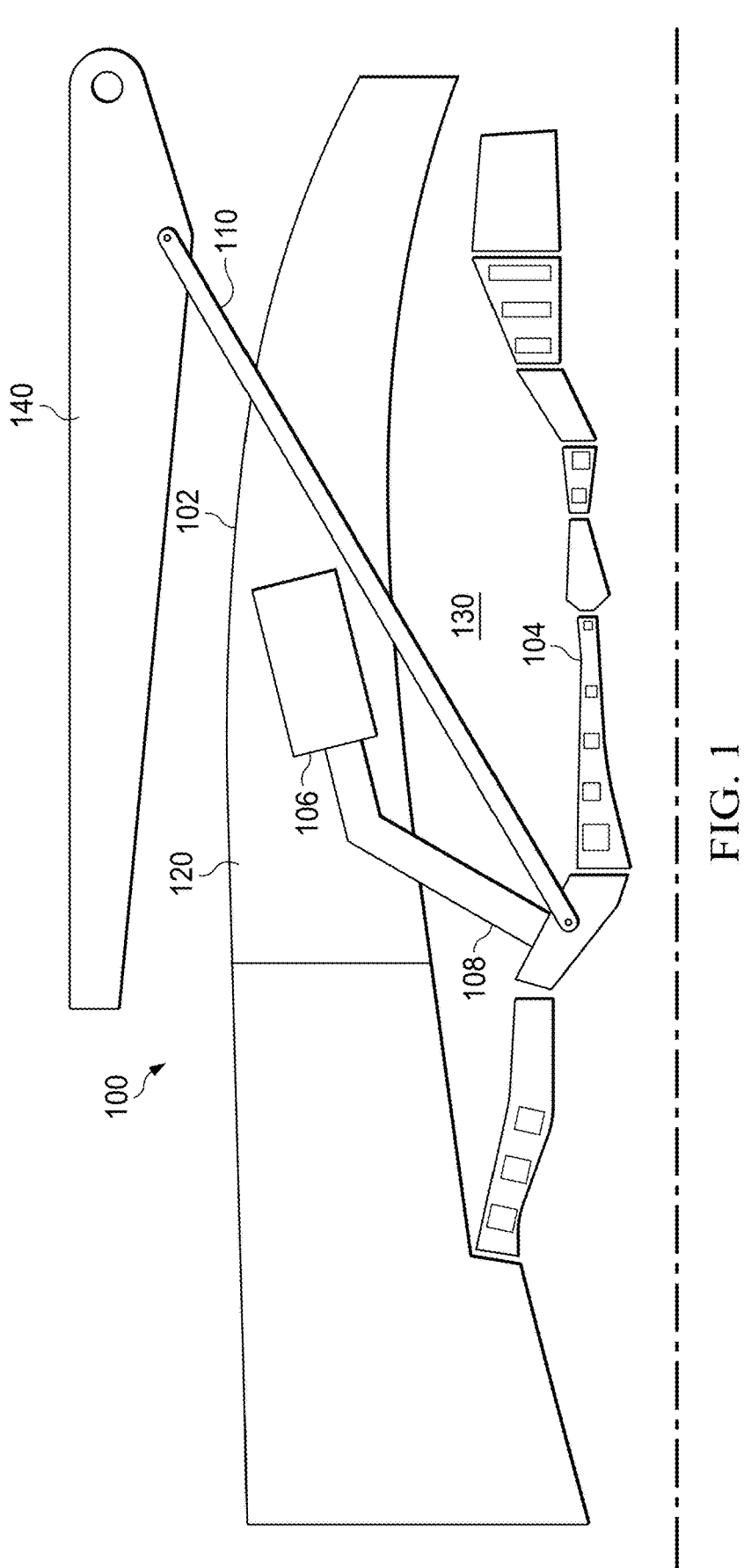
FIG. 1 illustrates a partial schematic view of an example hybrid-electric turbine engine assembly in accordance with this disclosure.

FIGS. 1 through 3, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

Current configurations of hybrid-electric gas turbine engines include an electrical machine (e.g., motor-generator) which is often located at bottom dead center of a gas turbine engine, where there is room in the lower bifurcation for a larger electrical machine to be packaged. However, this approach only allows for one electrical machine or accessory with mechanical offtakes from both the low spool and the high spool, rather than separate larger electrical machines or accessories on both the low spool and the high spool. The present disclosure provides a low spool electrical machine (for example, a motor-generator) arrangement for hybrid-electric gas turbine scenarios. For example, the low spool electrical machine arrangement may be utilized in an aircraft or other applications utilizing gas turbine engines. In some embodiments, the low spool electrical machine is integrated on a remotely mounted gearbox positioned towards engine top, centered position and between the engine thrust (mount) links and below the airframe pylon. In some embodiments, the electrical machine is located in close proximity to the motor control unit and thermal management system which reduces mechanical installation weight and installation complexity (routing, etc.) along the engine core compartment. This allows for significantly larger low spool electrical machines than current installation arrangements. In some embodiments, the low spool gearbox is integrated in a manner as to allow the electrical assembly (TMS, electrical machine, and controller) to all be removed from the engine core as a line replaceable unit (LRU) which enhances engine maintenance and modularity.

FIG. 1 illustrates a partial schematic view of an example hybrid-electric turbine engine assembly 100 in accordance with this disclosure. FIG. 1 as illustrated shows an upper portion of a turbofan engine assembly from above the centerline of the assembly. As shown in FIG. 1, assembly 100 includes a nacelle 102, an engine core 104, an electrical machine 106, a towershaft 108, an engine thrust link 110, and a pylon 140. Nacelle 102 includes an upper bifurcation 120 and an engine core compartment 130. Engine core 104 is disposed within the nacelle 102 and includes a low pressure spool (including a low pressure compressor coupled to and driven by a low pressure turbine via a first shaft) and a high pressure spool (including a high pressure compressor coupled to and driven by a high pressure turbine via a second shaft). In the illustrative example of FIG. 1, the low pressure spool is coupled to pylon 140 by engine thrust link 110. Electrical machine 106 is disposed within upper bifurcation 120 and is configured to transfer mechanical power between the low pressure spool of engine core 104 and electrical machine 106 via towershaft 108. Electrical machine 106 may be any of a generator, a motor, or a motor-generator. When electrical machine 106 is a generator or a motor-generator, electrical machine 106 may receive mechanical power from the low pressure spool of engine core 104 to turn an input shaft (or input/output shaft) of electrical machine 106 and generate electrical power. When electrical machine 106 is a motor or a motor-generator, electrical machine 106 may transmit mechanical power to the low pressure spool of engine core 104 by turning an output shaft (or input/output shaft) of electrical machine 106 to produce mechanical power.

Although FIG. 1 illustrates one example of a hybrid-electric turbine engine assembly 100, various changes may be made to FIG. 1. For example, assembly 100 may include at least two thrust links, the positions of various components may be changed, etc. Furthermore, while depicted as a turbofan engine assembly, assembly 100 may be configured as a different type of turbine engine assembly, such as a turboshaft engine, a propfan engine, or the like.

Figure 2A:
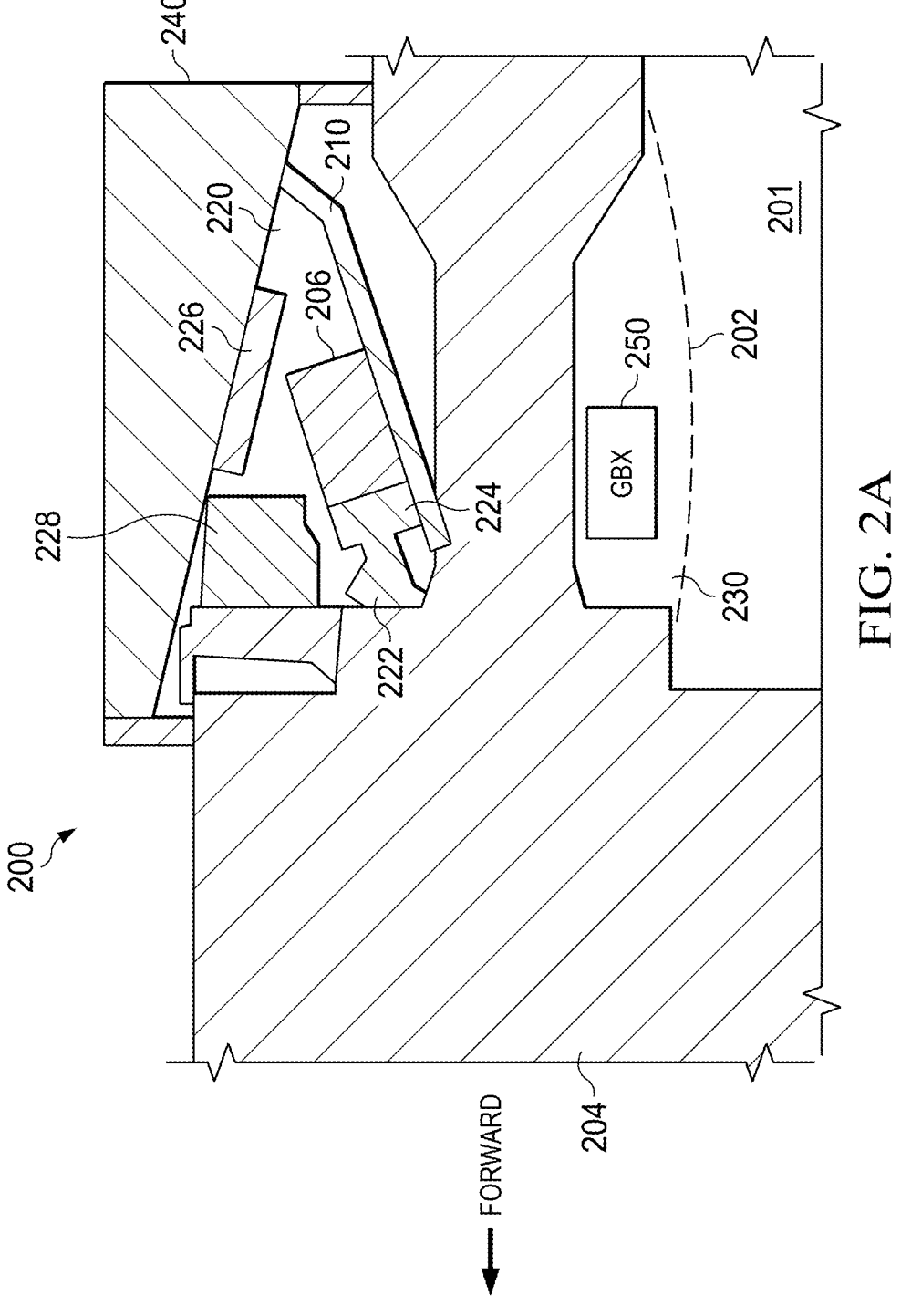
FIGS. 2A-2B illustrate partial schematic views of another example hybrid-electric turbine engine assembly in accordance with this disclosure.
Figure 2B:
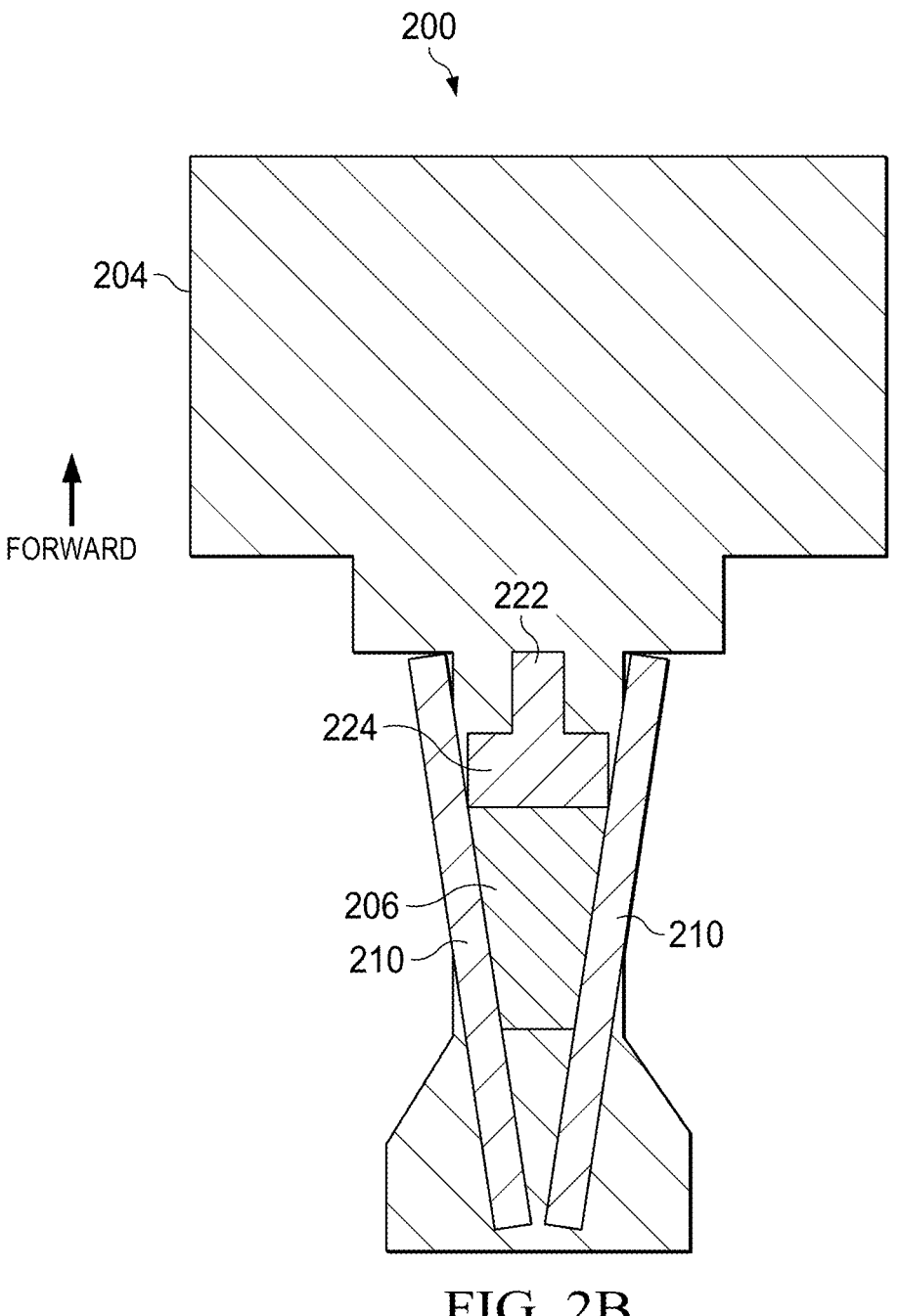

FIGS. 2A-2B illustrate partial schematic views of another example hybrid-electric turbine engine assembly 200 in accordance with this disclosure. It should be understood that the various views of FIGS. 2A-2B omit certain components of assembly 200 for clarity, but that assembly 200 includes the aggregate of the components illustrated in FIGS. 2A-2B. FIG. 2A depicts a side view of assembly 200, while FIG. 2B depicts an overhead view of assembly 200.

As shown in FIGS. 2A-2B, assembly 200 includes a nacelle 201 (only partially shown), an engine core 204, two engine thrust links 210, and a pylon 240. The nacelle 201 includes an inner flow surface 202, an upper bifurcation 220, and an engine core compartment 230, and is mounted to pylon 240. Pylon 240 may be used to mount assembly 200 to the airframe of an aircraft. Engine core 204 is disposed within the nacelle 201 and includes a low pressure spool (including a low pressure compressor coupled to and driven by a low pressure turbine via a first shaft) and a high pressure spool (including a high pressure compressor coupled to and driven by a high pressure turbine via a second shaft). In the illustrative example of FIGS. 2A-2B, the low pressure spool is coupled to pylon 240 by the two thrust links 210.

Additionally, assembly 200 includes an electrical machine 206, gearbox and towershaft 222, transmission 224, controller 226, and thermal management system (TMS) 228 which are disposed at least partially within upper bifurcation 220. It can be seen that Electrical machine 206 is disposed at a top, centered position over engine core 204 between the two thrust links 210. A top, centered position refers to the center of mass of electrical machine 206 being positioned above the center line of engine core 204 within a tolerance allowance. Electrical machine 206 is configured to transfer mechanical power between the low pressure spool of engine core 204 and electrical machine 206 via gearbox and towershaft 222 and transmission 224. For example, gearbox and towershaft 222 may be mechanically coupled to the low pressure spool of engine core 204 and transmission 224, and transmission 224 may be mechanically coupled to an input shaft (or input/output shaft) of electrical machine 206.

Electrical machine 206 may be any of a generator, a motor, or a motor-generator. When electrical machine 206 is a generator or a motor-generator, electrical machine 206 may receive mechanical power from the low pressure spool of engine core 204 to turn an input shaft (or input/output shaft) of electrical machine 206 and generate electrical power. When electrical machine 206 is a motor or a motor-generator, electrical machine 206 may transmit mechanical power to the low pressure spool of engine core 204 by turning an output shaft (or input/output shaft) of electrical machine 206 to produce mechanical power. Controller 226 is configured to control an operation of electrical machine 206. For example, if electrical machine 206 is a motor-generator, controller 226 may configure the operational mode of electrical machine 206 between motor mode and generator mode. TMS 228 is configured to provide cooling for electrical machine 206 and/or controller 226. For example, TMS 228 may be an air-oil-cooler, a heat exchanger, etc.

Additionally, assembly 200 includes a gearbox 250 disposed within engine core compartment 230 below engine core 204. Gearbox 250 is mechanically coupled to a high pressure spool of engine core 204 and may be used to drive accessories from the high pressure spool.

Although FIGS. 2A-2B illustrate one example of a hybrid-electric turbine engine assembly 200, various changes may be made to FIGS. 2A-2B. For example, assembly 200 may omit certain components such as transmission 224 which may be considered optional, the positions of various components may be changed, etc. Furthermore, while depicted as a turbofan engine assembly, assembly 200 may be configured as a different type of turbine engine assembly, such as a turboshaft engine, a propfan engine, or the like.

As previously described, in some embodiments, the low spool gearbox is integrated in a manner as to allow the assembly (TMS, electrical machine, and controller) to all be removed from the engine core as a line replaceable unit (LRU) which enhances engine maintenance and modularity.

Figure 3A:
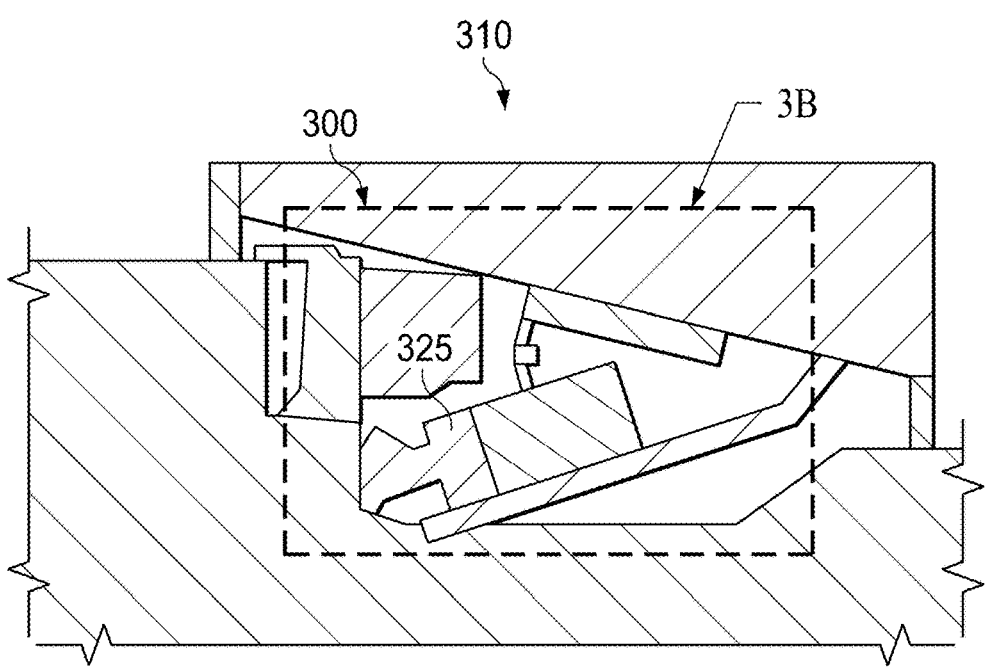
FIGS. 3A-3B illustrate a schematic view of an example line replaceable unit for a hybrid-electric turbine engine assembly in accordance with this disclosure.
Figure 3B:
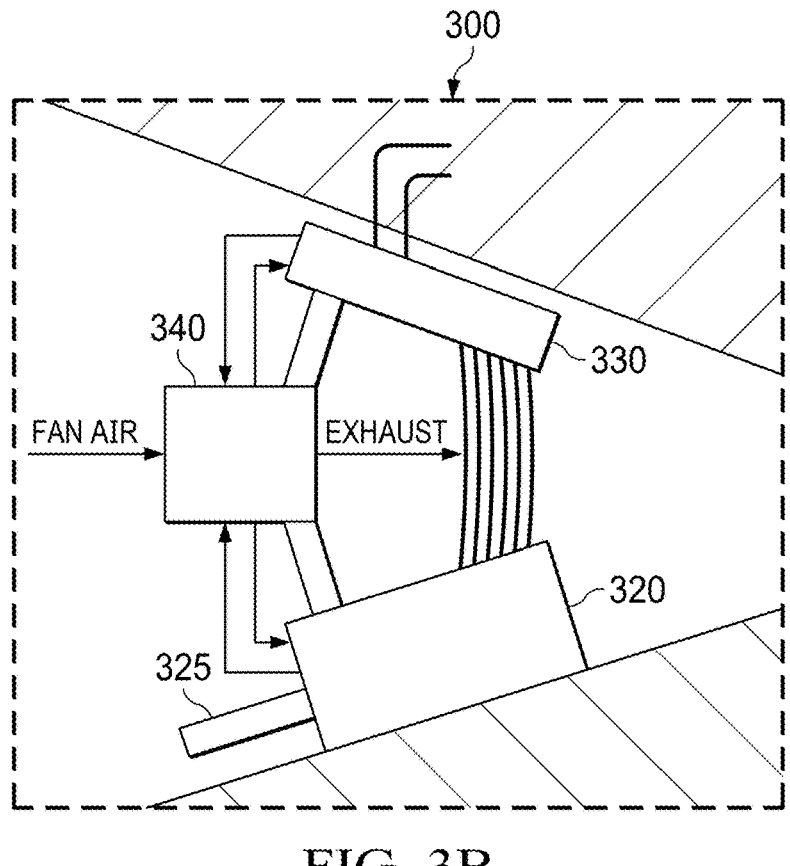

FIGS. 3A-3B illustrate a schematic view of an example LRU 300 for a hybrid-electric turbine engine assembly in accordance with this disclosure. FIGS. 3A-3B as illustrated show LRU 300 disposed in an upper portion of a turbofan engine assembly 310, which may be a turbofan engine assembly for an aircraft. For example, turbofan engine assembly may be similar to assembly 100 of FIG. 1 and assembly 200 of FIGS. 2A-2B.

LRU 300 includes an electrical machine 320, controller 330, and thermal management system (TMS) 340. Electrical machine 320 is configured to be disposed at a top, centered position over an engine core and between at least two thrust links similar to electrical machine 206 as shown in FIGS. 2A-2B when LRU 300 is installed in an engine assembly such as hybrid-electric turbine engine assembly 310. Electrical machine 320 is configured to transfer mechanical power between the low pressure spool of a gas turbine engine and electrical machine 320 via mechanical input (or input/output) 325. For example, mechanical input 325 may be any combination of a gearbox, a towershaft, and/or a transmission that mechanically couple an input shaft (or input/output shaft) of electrical machine 320 to the low pressure spool of a gas turbine engine.

Electrical machine 320 may be any of a generator, a motor, or a motor-generator. When electrical machine 320 is a generator or a motor-generator, electrical machine 320 may receive mechanical power from the low pressure spool of a gas turbine engine to turn an input shaft (or input/output shaft) of electrical machine 320 and generate electrical power. When electrical machine 320 is a motor or a motor-generator, electrical machine 320 may transmit mechanical power to the low pressure spool of a gas turbine engine by turning an output shaft (or input/output shaft) of electrical machine 320 to produce mechanical power. Controller 330 is configured to control an operation of electrical machine 320. For example, if electrical machine 320 is a motor-generator, controller 330 may configure the operational mode of electrical machine 206 between motor mode and generator mode. TMS 340 is configured to provide cooling for electrical machine 320 and/or controller 330. For example, TMS 340 may be an air-oil-cooler, a heat exchanger, etc.

Although FIGS. 3A-3B illustrate one example of an LRU 300, various changes may be made to FIGS. 3A-3B. For example, LRU 300 may omit certain components which may be considered optional, include additional components, the positions of various components may be changed, etc. Furthermore, while depicted as a turbofan engine assembly, hybrid-electric turbine engine assembly 310 may be configured as a different type of turbine engine assembly, such as a turboshaft engine, a propfan engine, or the like.

It may be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
   a nacelle including an upper bifurcation and an engine core compartment;
   a gas turbine engine including an engine core disposed within the nacelle;
   an electrical machine disposed within the upper bifurcation and configured to transfer mechanical power between the engine core and the electrical machine; and
   a thermal management system (TMS) configured to cool (i) the electrical machine and (ii) a controller configured to control an operation of the electrical machine.

2. The system of claim 1, further comprising:
   a gearbox mechanically coupled to the electrical machine; and
   a towershaft mechanically coupled to the gearbox and the engine core,
   wherein the gearbox and the towershaft are configured to transfer the mechanical power between the engine core and the electrical machine.

3. The system of claim 2,
wherein the TMS is a heat exchanger.

4. The system of claim 1, wherein the electrical machine is disposed at a top, centered position of the gas turbine engine.

5. The system of claim 4, wherein:
the gas turbine engine is mounted to the nacelle via at least two thrust links disposed atop the engine; and
the electrical machine is disposed between the at least two thrust links.

6. The system of claim 1, further comprising the controller.

7. The system of claim 1, wherein the TMS is disposed within the upper bifurcation.

8. A line replaceable unit (LRU) comprising:
an electrical machine configured to transfer mechanical power between an engine core of a gas turbine engine and the electrical machine; and
a thermal management system (TMS) configured to cool (i) the electrical machine and (ii) a controller configured to control an operation of the electrical machine,
wherein the line replaceable unit is configured to be disposed within an upper bifurcation of a nacelle configured to house the gas turbine engine within the nacelle.

9. The LRU of claim 8, further comprising:
a gearbox mechanically coupled to the electrical machine, the gearbox configured to mechanically couple to the engine core via a towershaft to transfer the mechanical power between the engine core and the electrical machine.

10. The LRU of claim 9,
wherein the TMS is a heat exchanger.

11. The LRU of claim 8, wherein the electrical machine is configured to be positioned at a top, centered position of the gas turbine engine when the LRU is disposed within the upper bifurcation of the nacelle.

12. The LRU of claim 8, further comprising the controller.

13. The LRU of claim 8, wherein the TMS is an air-oil-cooler.

14. An aircraft comprising:
a nacelle including an upper bifurcation and an engine core compartment, the nacelle mounted to the aircraft via a pylon;
a gas turbine engine including an engine core, the gas turbine engine disposed within the nacelle and mounted to the nacelle via at least two thrust links disposed atop the gas turbine engine and below the pylon;
an electrical machine configured to transfer mechanical power between the engine core and the electrical machine, the electrical machine disposed at a top, centered position above the gas turbine engine between the thrust links; and
a thermal management system (TMS) configured to cool (i) the electrical machine and (ii) a controller configured to control an operation of the electrical machine.

15. The aircraft of claim 14, further comprising:
a gearbox mechanically coupled to the electrical machine; and
a towershaft mechanically coupled to the gearbox and the engine core,
wherein the gearbox and the towershaft are configured to transfer the mechanical power between the engine core and the electrical machine.

16. The aircraft of claim 15,
wherein the TMS is a heat exchanger.

17. The aircraft of claim 14, further comprising the controller.

18. The aircraft of claim 17, wherein the controller is disposed within the upper bifurcation.

19. The aircraft of claim 14, wherein the TMS is an air-oil-cooler.

20. The aircraft of claim 19, wherein the TMS is disposed within the upper bifurcation.

* * * * *